United States Patent
Chernov et al.

(10) Patent No.: US 10,926,206 B1
(45) Date of Patent: Feb. 23, 2021

(54) FILTER ASSEMBLY WITH LEAK DETECTION FEATURES

(71) Applicant: Haier US Appliance Solutions, Inc., Wilmington, DE (US)

(72) Inventors: Gregory Sergeevich Chernov, Louisville, KY (US); Bradford Gasior, Louisville, KY (US); Andrew Reinhard Krause, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 16/783,233

(22) Filed: Feb. 6, 2020

(51) Int. Cl.
| | | |
|---|---|---|
| *B01D 35/30* | (2006.01) | |
| *B01D 27/10* | (2006.01) | |
| *G01M 3/04* | (2006.01) | |
| *G01M 3/16* | (2006.01) | |

(52) U.S. Cl.
CPC .......... *B01D 35/30* (2013.01); *B01D 27/108* (2013.01); *G01M 3/045* (2013.01); *G01M 3/16* (2013.01); *B01D 2201/56* (2013.01); *F25D 2700/08* (2013.01)

(58) Field of Classification Search
CPC ...... B01D 35/14; B01D 35/143; B01D 35/30; B01D 2201/56; G01M 3/04; G01M 3/045; G01M 3/16; F25D 2700/08; C02F 2201/006
See application file for complete search history.

(56) References Cited

U.S. PATENT DOCUMENTS

| | | | |
|---|---|---|---|
| 7,044,154 B2 | 5/2006 | Henderson et al. | |
| 9,274,020 B2 | 3/2016 | Chernov et al. | |
| 9,366,388 B2 | 6/2016 | Krause et al. | |
| 9,506,886 B1 * | 11/2016 | Woodbury | A61F 13/42 |
| 10,040,009 B1 * | 8/2018 | Krause | C02F 1/001 |
| 10,173,155 B2 | 1/2019 | Chernov et al. | |
| 2015/0290568 A1 | 10/2015 | Chernov et al. | |

FOREIGN PATENT DOCUMENTS

| | | |
|---|---|---|
| JP | 2007163255 A | 6/2007 |
| KR | 20060125151 A | 12/2006 |

\* cited by examiner

*Primary Examiner* — Terry K Cecil
(74) *Attorney, Agent, or Firm* — Dority & Manning, P.A.

(57) ABSTRACT

A filter cartridge includes a casing. A filter medium is disposed within the casing. A radio-frequency identification, RFID, tag is positioned on the casing. A leak detection pad is positioned on the casing. The RFID tag is in communication with the leak detection pad. The RFID tag is configured to transmit a leak detection signal in response to a liquid at the leak detection pad.

20 Claims, 4 Drawing Sheets

FILTER ASSEMBLY WITH LEAK DETECTION FEATURES

FIELD OF THE INVENTION

The present subject matter relates generally to filter assemblies, such as filter assemblies for refrigerator appliances.

BACKGROUND OF THE INVENTION

Certain water filter assemblies include a manifold and a filter cartridge. The manifold directs unfiltered water into the filter cartridge and filtered water out of the filter cartridge. The filter cartridge includes a filter medium, such as an activated carbon block, a pleated polymer sheet, a spun cord material, or a melt blown material. The filter medium is positioned within the filter cartridge and filters water passing therethrough.

Over time, the filter cartridge is subject to fatigue from repeated loading and unloading of fluid pressure within the filter cartridge, and the filter cartridge is susceptible to failure, such as bursting, due to material fatigue. The filter cartridge can also be exposed to a variety of temperatures that can lead to filter cartridge failure. As an example, the filter cartridge may be exposed to freezing conditions, and water within the filter cartridge can freeze. In such conditions, the filter cartridge is also susceptible to failure, such as bursting, due to expansion of water within the filter cartridge.

During filter cartridge failures, water may leak from the filter cartridge and negatively affect surrounding items. Such failures can also be difficult to detect. In particular, water filter assemblies are often positioned in relatively remote locations within refrigerator appliances such that visually monitoring the water filter assemblies for leaks can be difficult or infrequent. Similar problems can make detecting liquid water and water leaks difficult in other circumstances and locations as well.

BRIEF DESCRIPTION OF THE INVENTION

Aspects and advantages of the invention will be set forth in part in the following description, or may be apparent from the description, or may be learned through practice of the invention.

In an example embodiment, a filter cartridge includes a casing. A filter medium is disposed within the casing. A radio-frequency identification, RFID, tag is positioned on the casing. A leak detection pad is positioned on the casing. The RFID tag is in communication with the leak detection pad. The RFID tag is configured to transmit a leak detection signal in response to a liquid at the leak detection pad.

In an example aspect, the RFID tag is configured to transmit the leak detection signal to an RFID reader in response to the liquid at the leak detection pad.

In an example aspect, the leak detection pad comprises a pair of terminals, and each terminal of the pair of terminals includes a respective plurality of conductive fingers. The plurality of conductive fingers of a first terminal of the pair of terminals is interdigitated with the plurality of conductive fingers of a second terminal of the pair of terminals.

In an example aspect, a label is adhered to the casing. The plurality of conductive fingers of the first terminal and the plurality of conductive fingers of the second terminal are printed on the label.

In an example aspect, the plurality of conductive fingers of the first terminal and the plurality of conductive fingers of the second terminal are printed on a plastic layer of the label.

In an example aspect, a paper layer of the label contacts the plurality of conductive fingers of the first terminal and the plurality of conductive fingers of the second terminal.

In an example aspect, the label extends between a top portion and a bottom portion. The paper layer extends from the bottom portion of the label to the plurality of conductive fingers of the first terminal and the plurality of conductive fingers of the second terminal.

In an example aspect, the bottom portion of the label is positioned adjacent a bottom portion of the casing.

In an example aspect, a label adhered to the casing. The RFID tag and the leak detection pad are printed on the label.

In an example aspect, a paper layer of the label contacts the pair of terminals.

In an example aspect, an antenna of the RFID tag is spaced from the paper layer of the label.

In an example aspect, the label extends between a top portion and a bottom portion. The paper layer extends from the bottom portion of the label to the pair of terminals.

In an example aspect, the bottom portion of the label is positioned adjacent a bottom portion of the casing.

Each of the example aspects recited above may be combined with one or more of the other example aspects recited above in certain embodiments. For instance, all of the twelve example aspects recited above may be combined with one another in some embodiments. As another example, any combination of two, three, four, five, or more of the twelve example aspects recited above may be combined in other embodiments. Thus, the example aspects recited above may be utilized in combination with one another in some example embodiments. Alternatively, the example aspects recited above may be individually implemented in other example embodiments. Accordingly, it will be understood that various example embodiments may be realized utilizing the example aspects recited above.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
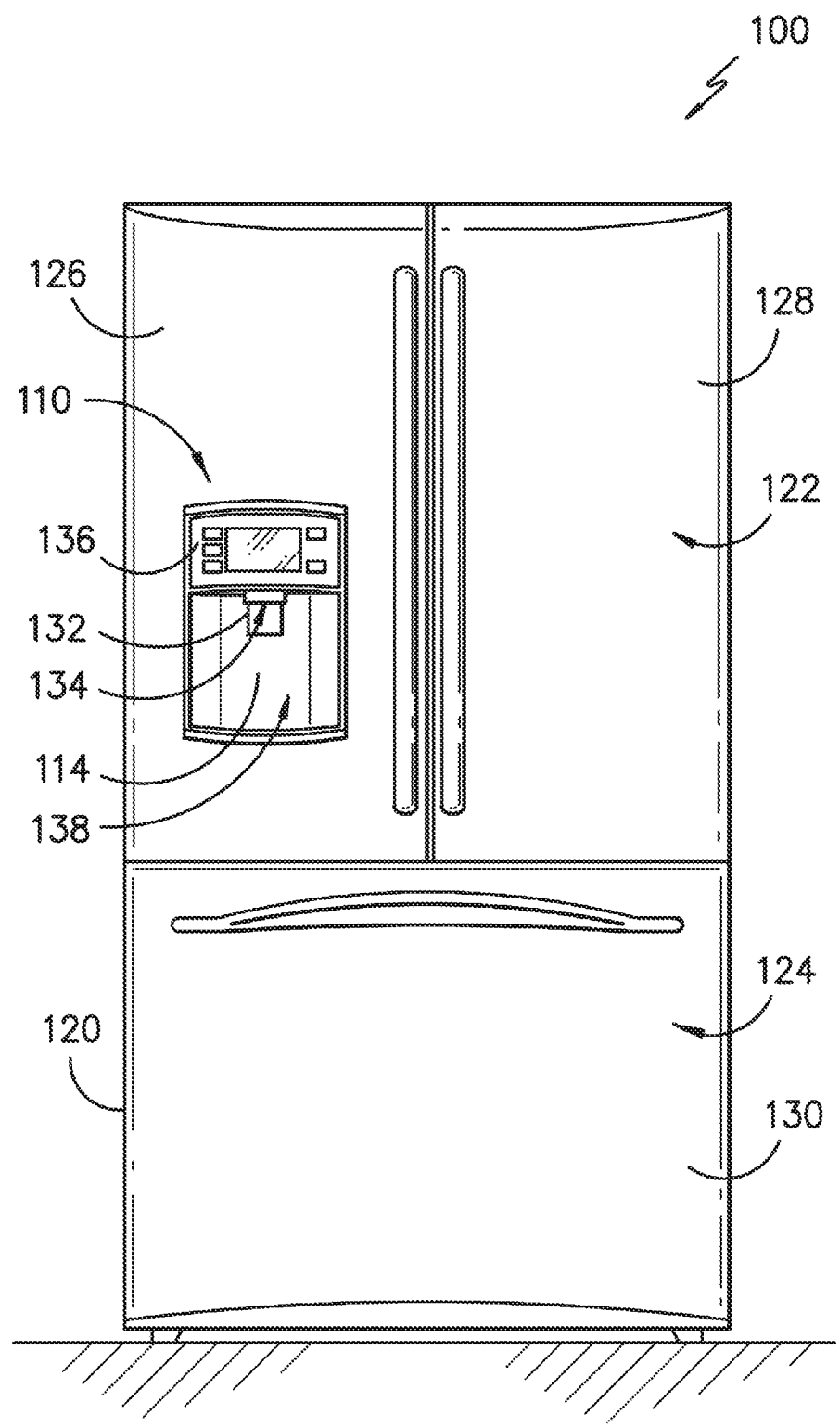
FIG. 1 provides a front view of an exemplary refrigerator appliance.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a front view of an exemplary embodiment of a refrigerator appliance 100 as may be equipped with an example fluid filter assembly of the present invention. However, as will be understood using the teachings disclosed herein, the fluid filter assembly (including the filter cartridge) of the present invention may be used with other refrigerator appliance configurations as well as other types of appliances. It may also be used in applications other than appliances as well. For example, the filtering system of the present invention may be installed under a kitchen sink or as part of a whole housing filtration system. As such, refrigerator appliance 100 is provided only by way of example of an application of the exemplary fluid filter assembly of the present subject matter.

Refrigerator appliance 100 includes a cabinet or housing 120 defining an upper fresh food chamber 122 and a lower freezer chamber 124 arranged below the fresh food chamber 122. As such, refrigerator appliance 100 is generally referred to as a bottom mount refrigerator. In this exemplary embodiment, housing 120 also defines a mechanical compartment (not shown) for receipt of a sealed cooling system. Using the teachings disclosed herein, one of skill in the art will understand that the present invention can be used with other types of refrigerators (e.g., side-by-sides).

Refrigerator doors 126, 128 are rotatably hinged to an edge of housing 120 for accessing fresh food chamber 122. A freezer door 130 is arranged below refrigerator doors 126, 128 for accessing freezer chamber 124. In the exemplary embodiment, freezer door 130 is coupled to a freezer drawer (not shown) that is slidably mounted within freezer chamber 124.

Refrigerator appliance 100 includes a dispensing assembly 110 for dispensing water and/or ice. Dispensing assembly 110 includes a dispenser 114 positioned on an exterior portion of refrigerator appliance 100. Dispenser 114 includes a discharging outlet 134 for accessing ice and water. An activation member 132 is mounted below discharging outlet 134 for operating dispenser 114. In FIG. 1, activation member 132 is shown as a paddle. However, activation member 132 may be any other suitable mechanism for signaling or initiating a flow of ice and/or water into a container within dispenser 114, e.g., a switch or button. A user interface panel 136 is provided for controlling the mode of operation. For example, user interface panel 136 includes a water dispensing button (not labeled) and an ice-dispensing button (not labeled) for selecting a desired mode of operation such as crushed or non-crushed ice.

Discharging outlet 134 and activation member 132 are an external part of dispenser 114, and are mounted in a recessed portion 138 defined in an outside surface of refrigerator door 126. Recessed portion 138 is positioned at a predetermined elevation convenient for a user to access ice or water and enabling the user to access ice without the need to bend-over and without the need to access fresh food chamber 122. In the exemplary embodiment, recessed portion 138 is positioned at a level that approximates the chest level of a user.

Figure 2:
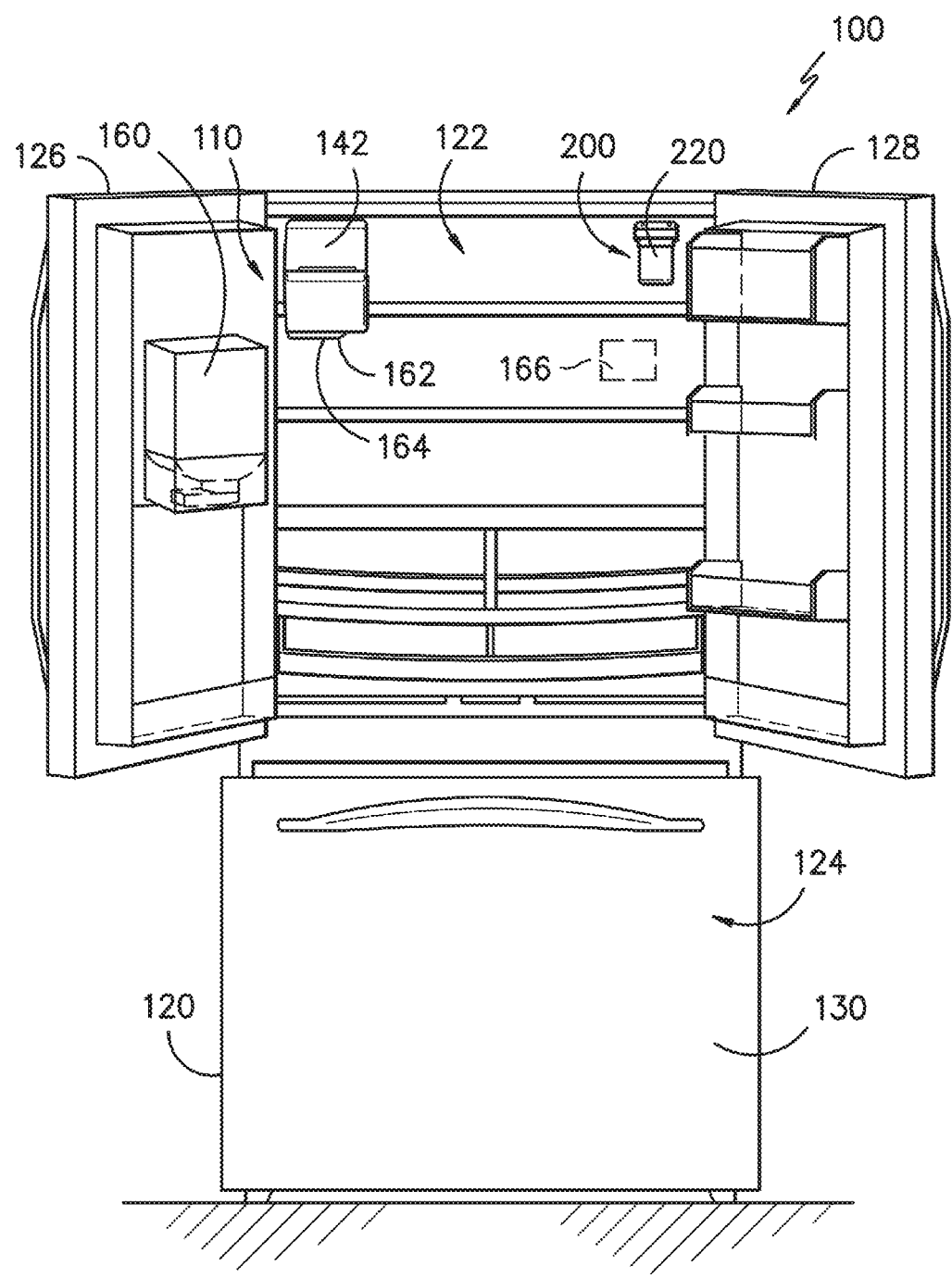
FIG. 2 provides a front view of the exemplary refrigerator appliance of FIG. 1 with refrigerator doors in an open position to show a filter assembly according to an example embodiment of the present subject matter.

FIG. 2 is a perspective view of refrigerator appliance 100 having refrigerator doors 126, 128 in an open position to reveal the interior of the fresh food chamber 122. As such, certain components of dispensing assembly 110 are illustrated. Dispensing assembly 110 includes an insulated housing 142 mounted within chamber 122. Due to insulation surrounding insulated housing 142, the temperature within insulated housing 142 can be maintained at levels different from the ambient temperature in the surrounding fresh food chamber 122.

In particular, insulated housing 142 is constructed and arranged to operate at a temperature that facilitates producing and storing ice. Insulated housing 142 contains an ice maker (not shown) for creating ice and feeding the same to a receptacle 160 that is mounted on refrigerator door 126. As illustrated in FIG. 2, receptacle 160 is placed at a vertical position on refrigerator door 126 that will allow for the receipt of ice from a discharge opening 162 located along a bottom edge 164 of insulated housing 142 when refrigerator door 126 is in a closed position (shown in FIG. 1). As refrigerator door 126 is closed or opened, receptacle 160 is moved in and out of position under insulated housing 142.

Operation of the refrigerator appliance 100 is regulated by a controller 166 that is in communication with (or operatively coupled with) user interface panel 136 and/or activation member 132 (shown in FIG. 1). User interface panel 136 provides selections for user manipulation of the operation of refrigerator appliance 100 such as e.g., selections between whole or crushed ice, chilled water, and/or other options as well. In response to user manipulation of the user interface panel 136, controller 166 operates various components of the refrigerator appliance 100. Controller 166 may include a memory and one or more microprocessors, CPUs or the like, such as general or special purpose microprocessors operable to execute programming instructions or microcontrol code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor.

Controller 166 may be positioned in a variety of locations throughout refrigerator appliance 100 in addition to the location shown in FIG. 2. For example, controller 166 may be located within or beneath the user interface panel 136 on refrigerator door 126. In such an embodiment, input/output ("I/O") signals may be routed between the controller and various operational components of refrigerator appliance 100. In one exemplary embodiment, the user interface panel 136 may represent a general purpose I/O ("GPIO") device or functional block. In another exemplary embodiment, the user interface 136 may include input components, such as one or more of a variety of electrical, mechanical or electro-mechanical input devices including rotary dials, push buttons, and touch pads. The user interface panel 136 may be in communication with the controller via one or more signal lines or shared communication busses.

Refrigerator appliance 100 also includes an exemplary filter assembly or fluid filtration system 200 that filters water coming into refrigerator appliance 100 from a water supply (not shown), such as a municipal water source or a well. Fluid filter assembly 200 can remove contaminants, such as chlorine, chloroform, lead, arsenic, pharmaceuticals, microbes, and/or other undesirable substances, from water supplied to refrigerator appliance 100. In particular, fluid filter assembly 200 can supply filtered water to the ice maker within insulated housing 142 and/or discharging outlet 134. As will be understood by those skilled in the art and as used herein, the term "water" includes purified water and solutions or mixtures containing water and, e.g., elements (such as calcium, chlorine, and fluorine), salts, bacteria, nitrates, organics, and other chemical compounds or substances.

For this exemplary embodiment, fluid filter assembly 200 is shown positioned within fresh food chamber 122. However, fluid filter assembly 200 may also be located e.g., on the exterior of refrigerator 100, on a surface adjacent to refrigerator 100, connected into a water supply line (not shown) providing fluid to refrigerator 100, and other locations as well. Also, as stated above, fluid filter assembly 200 may also be located under a sink, configured as part of a whole house filtration system, or otherwise configured for other applications as well.

Figure 3:
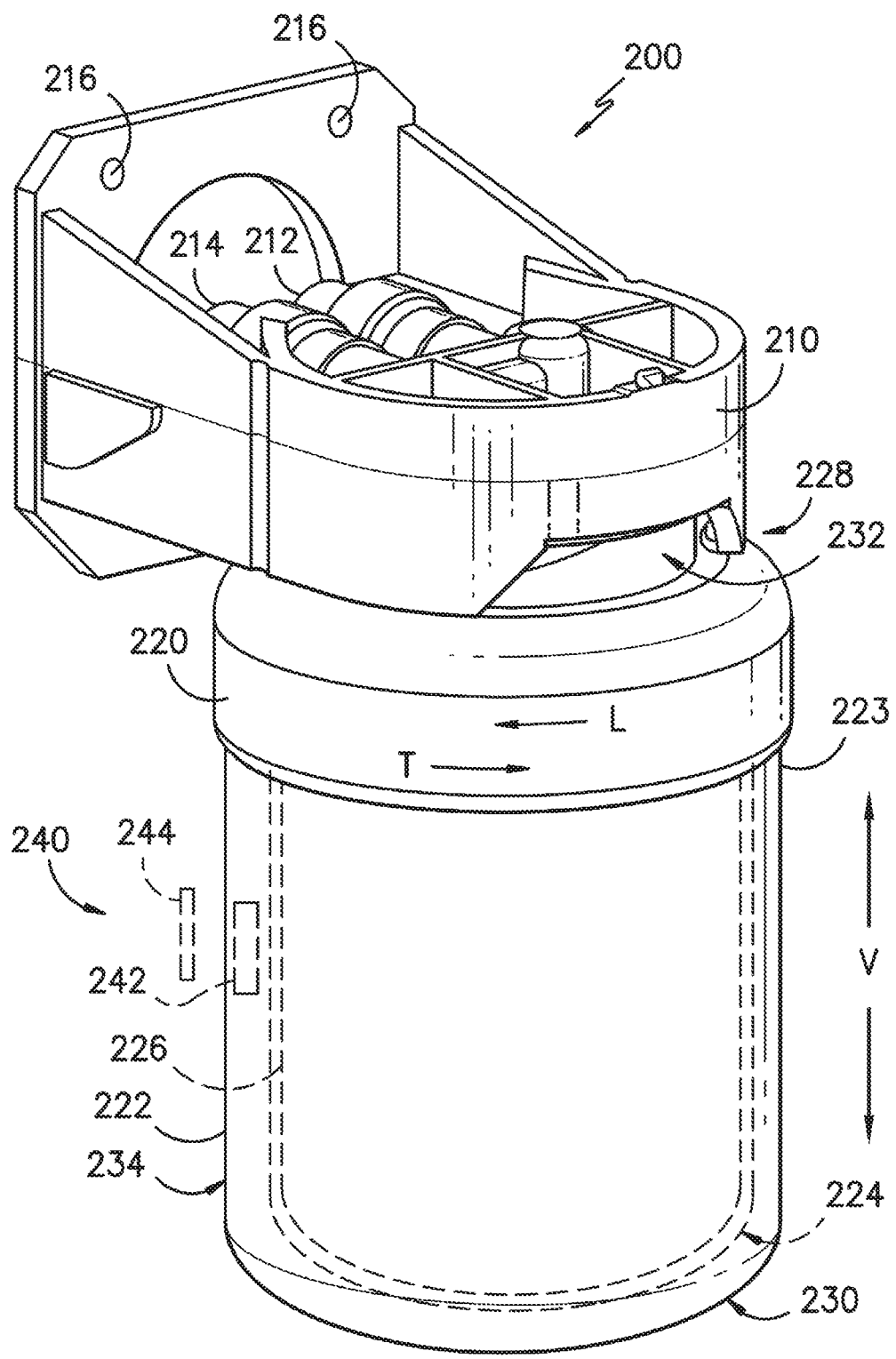
FIG. 3 is a perspective view of the example filter assembly of FIG. 2.

Referring now to FIG. 3, fluid filter assembly 200 includes a manifold 210. A fluid inlet 212 and fluid outlet 214 are provided for a flow of unfiltered fluid into fluid filter assembly 200 and a flow of filtered fluid out of fluid filter assembly 200, respectively. Fluid inlet 212 and fluid outlet 214 are adapted for coupling manifold 210 to a fluid supply system such as e.g., the piping system within a user's dwelling that may be connected with a well or municipal water supply. By way of example, fluid inlet 212 and fluid outlet 214 may be equipped with slip fittings, threads, fasteners, and/or other mechanisms for attachment. Apertures 216 allow for connection of fluid filter assembly 200 to a wall, cabinet, or other surface. Other methods of attachment may also be used.

Fluid filter assembly 200 also includes a filter cartridge 220. Filter cartridge 220 includes a housing or casing 222 that defines an interior volume or chamber 224 into which a filter medium 226 is received. Filter medium 226 may be any suitable filter medium and may constructed from a variety of different types of filter media including textiles, resins, webs, and other components as well. Filtration with filter medium 226 may be based upon e.g., size exclusion, adsorption, and/or other mechanisms. Thus, filter medium 226 may include an activated carbon block, a reverse osmosis membrane, a pleated polymer or cellulose sheet, or a melt blown or spun cord medium. As used herein, the term "unfiltered" describes water that is not filtered relative to filtering medium 226. However, as will be understood by those skilled in the art, fluid filter assembly 200 may include additional filters that filter water entering chamber 224. Thus, "unfiltered" may be filtered relative to other filters but not filter medium 226. While a variety of different constructions may be used, filter medium 226 may be a cylindrically-shaped and configured so that fluid flows radially inward towards a center of filter medium 226 as particulates or other matter are removed by filter medium 226.

Filter cartridge 220 may be mounted to manifold 210. In particular, filter cartridge 220 may be mounted to manifold 210 such that filter cartridge 220 is removable from manifold 210. Any suitable method or mechanism may be used to removably couple filter cartridge 220 to manifold 210. For example, filter cartridge 220 may be threaded to manifold 210. When filter cartridge 220 is mounted to manifold 210, filter cartridge 220 receives unfiltered water received from inlet 212 of manifold 210. Thus, filter cartridge 220 filters water passing through fluid filter assembly 200. Filter cartridge 220 extends between a top portion 228 and a bottom portion 230, e.g., along a vertical direction V. A connection 232 of filter cartridge 220 is positioned at or proximate top portion 228 of filter cartridge 220. Connection 232 of filter cartridge 220 is configured for engaging manifold 210, e.g., in order to removably mount filter cartridge 220 to manifold 210.

Connection 232 of filter cartridge 220 also places filter cartridge 220 in fluid communication with manifold 210 when filter cartridge 220 is mounted to manifold 210. Thus, filter cartridge 220 can receive unfiltered water from inlet 212 of manifold 210 at connection 232 and direct such unfiltered water into chamber 224 when filter cartridge 220 is mounted to manifold 210. Water within chamber 224 can pass through filter medium 226 positioned within chamber 224 and can exit chamber 224 as filtered water. In particular, connection 232 of filter cartridge 220 can direct filtered water out of chamber 224 to outlet 214 of manifold 210 when filter cartridge 220 is mounted to manifold 210. In such a manner, filter medium 226 of filter cartridge 220 can filter a flow of water through water fluid filter assembly 200. Such filtering can improve taste and/or safety of water.

As will be understood by those skilled in the art, filtering medium 226 of filter cartridge 220 can lose efficacy over time. Thus, a user can replace filter cartridge 220 and/or filtering medium 226 of filter cartridge 220 at regular intervals or after a certain volume of water has passed through filter cartridge 220. To replace filter cartridge 220 and/or filtering medium 226 of filter cartridge 220, the user can remove or disconnect filter cartridge 220 from manifold 210 and insert or mount a new filter cartridge 220 or filtering medium 226 of filter cartridge 220.

Fluid filter assembly 200 can be exposed to a variety of conditions within that can negatively affect performance of fluid filter assembly 200. For example, high water pressure at inlet 212 of manifold 210 and/or connection 232 of filter cartridge 220 or exposing fluid filter assembly 200 to freezing conditions can negatively affect performance of fluid filter assembly 200. Such conditions can cause fluid filter assembly 200 to leak, e.g., at connection 232 of filter cartridge 220. Such conditions can also cause fluid filter assembly 200 to deform or crack. As discussed in greater detail below, fluid filter assembly 200 includes features for detecting such malfunctions of fluid filter assembly 200.

Fluid filter assembly 200 includes a system 240 for detecting liquid water. System 240 includes a radio frequency identification reader or RFID reader 244 (shown schematically). System 240 also includes a radio frequency identification tag or RFID tag 242. RFID reader 244 is configured for receiving a signal from RFID tag 242. Thus, RFID reader 244 and RFID tag 242 can be in signal communication with each other.

In certain exemplary embodiments, RFID tag 242 is a passive RFID tag.

Thus, RFID reader 244 can receive a radio signal from RFID tag 242 in response to a query or request signal from RFID reader 244. In particular, RFID tag 242 can generate or transmit the response radio signal utilizing energy transmitted, e.g., wirelessly, to RFID tag 242 from RFID reader 244 via the query or request signal from RFID reader 244. Thus, RFID tag 242 need not include a battery or other power source in order to generate or transmit the response radio signal. In other exemplary embodiments, RFID tag 242 is an active RFID tag and includes a battery or is connected to a suitable power source. Thus, RFID tag 242 can continuously or intermittently generate or transmit a signal that RFID reader 244 can receive. As will be understood by those skilled in the art, RFID reader 244 and RFID tag 242 can have any other suitable setup or configuration for placing RFID reader 244 and RFID tag 242 in signal communication with each other. Thus, RFID reader 244 may be passive or active, and RFID tag 242 may be passive or active depending upon the desired setup of system 240.

As will be understood by those skilled in the art, signal communication between RFID reader 244 and RFID tag 242 is affected by a variety of factors. For example, signal communication between RFID reader 244 and RFID tag 242 can be limited or terminated if a gap between RFID reader 244 and RFID tag 242 is increased. RFID reader 244 and RFID tag 242 can also be tuned such that signal communication between RFID reader 244 and RFID tag 242 is established with a particular transmission medium, such as air, disposed between RFID reader 244 and RFID tag 242, e.g., within the gap between RFID reader 244 and RFID tag 242. Thus, the signal communication between RFID reader 244 and RFID tag 242 can be disrupted or terminated if the transmission medium changes and another material is positioned between RFID reader 244 and RFID tag 242. For example, if water is positioned between RFID reader 244 and RFID tag 242, the signal communication between RFID reader 244 and RFID tag 242 can be terminated or disrupted. In particular, liquid water can absorb radio waves and thereby terminate or disrupt signal communication between RFID reader 244 and RFID tag 242. Liquid water can also affect transmission and reception of radio waves by antennas of RFID reader 244 and/or RFID tag 242. When signal communication between RFID reader 244 and RFID tag 242 is disrupted, lost or terminated, it can be inferred that liquid water is disposed between RFID reader 244 and RFID tag 242 (e.g., that liquid water is disposed within the gap between RFID reader 244 and RFID tag 242). For example, when signal communication between RFID reader 244 and RFID tag 242 is interrupted, it can be inferred that fluid filter assembly 200 is leaking or otherwise malfunctioning.

Figure 4:
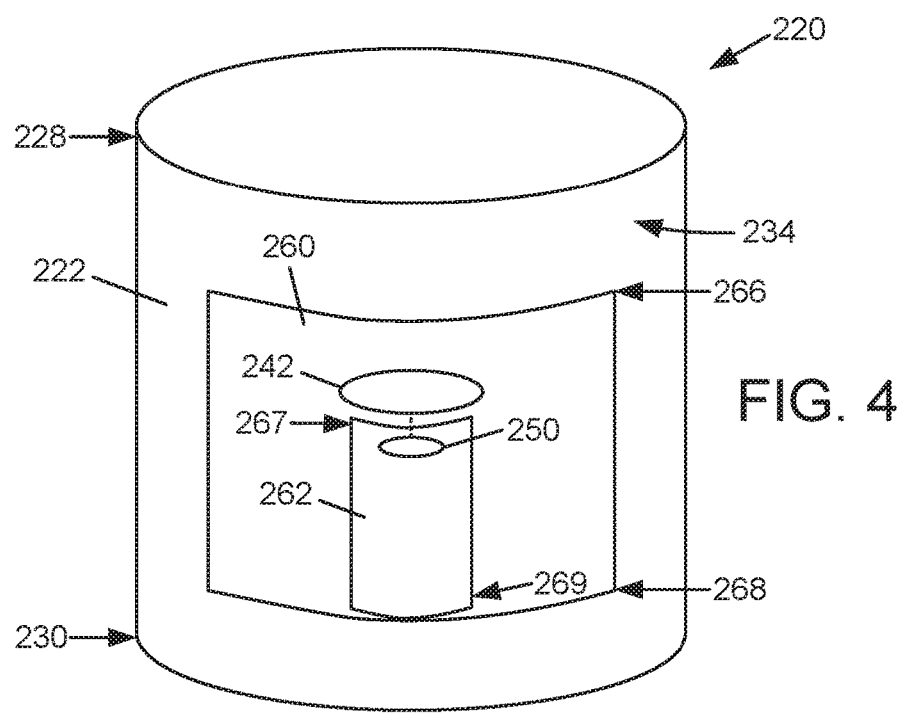
FIG. 4 is a schematic view of a filter cartridge of the example filter assembly of FIG. 2.
Figure 5:
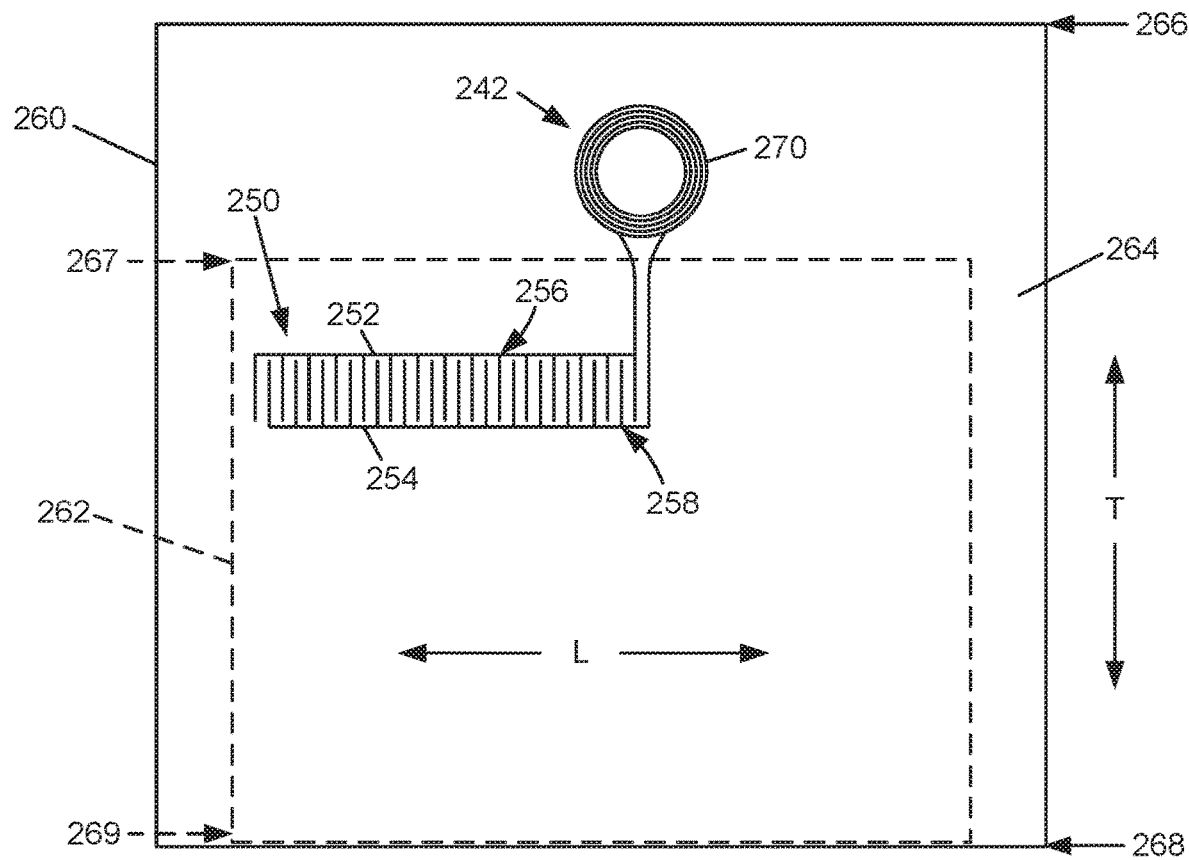
FIG. 5 is a schematic view of certain features of the example filter cartridge of FIG. 4.

System 240 also includes other features for detecting liquid water. Such features are discussed in greater detail below in the context of FIGS. 4 and 5. As shown in FIGS. 4 and 5, a leak detection pad 250 may be positioned on casing 222, e.g., on an outer surface 234 of casing 222. Leak detection pad 250 is in, e.g., direct, electrical communication with RFID tag 242. For instance, leads may connect terminals 252, 254 of leak detection pad 250 to terminals of RFID tag 242. Leak detection pad 250 may be configured to detect liquid water at, adjacent, on, etc. leak detection pad 250. When leak detection pad 250 detects a liquid, RFID tag 242 may transmit a leak detection signal, e.g., to RFID reader 244, which communicates with controller 166. In response to the leak detection signal, controller 166 may take one or more remediating actions, such as closing a supply valve, activating a user alert, etc.

Leak detection pad 250 may detect a liquid in any suitable manner. For example, a circuit may be formed between leak detection pad 250 and RFID tag 242. Leak detection pad 250 may be configured to open and close the circuit between leak detection pad 250 and RFID tag 242 in response to the presence of liquid water at leak detection pad 250. In one example embodiment, the circuit between leak detection pad 250 and RFID tag 242 may be open when there is no liquid water at leak detection pad 250. Conversely, leak detection pad 250 may close the circuit between leak detection pad 250 and RFID tag 242 when liquid water is at, adjacent, on, etc. leak detection pad 250. In particular, a liquid may bridge terminals 252, 254 of leak detection pad 250 when the liquid contacts terminals 252, 254 to close the circuit between leak detection pad 250 and RFID tag 242. Conversely, without the liquid bridging terminals 252, 254, the circuit between leak detection pad 250 and RFID tag 242 may remain open. In another example embodiment, a conductivity of leak detection pad 250 in the circuit between leak detection pad 250 and RFID tag 242 may change depending on the presence and amount liquid at, adjacent, on, etc. leak detection pad 250. In particular, a liquid between terminals 252, 254 of leak detection pad 250 may dissolve a salt or otherwise change a conductivity between terminals 252, 254. RFID tag 242 may detect the change in the conductivity between terminals 252, 254 and thereby detect the presence of water at leak detection pad 250. Conversely, without the liquid at terminals 252, 254, the conductivity between terminals 252, 254 may remain relatively constant.

Terminals 252, 254 may be spaced apart from each other on leak detection pad 250. For example, each of the terminals 252, 254 may have a respective plurality of conductive fingers. In particular, a first terminal 252 may have a plurality of conductive fingers 256, and a second terminal 254 may have a plurality of conductive fingers 258. Conductive fingers 256 of first terminal 252 may be interdigitated with conductive fingers 258 of second terminal 254. A length of leak detection pad 250, e.g., between opposite ends of terminals 252, 254 along a longitudinal direction L, may be greater than a width of leak detection pad 250, e.g., between opposite sides of terminals 252, 254 along a transverse direction T that is perpendicular to the longitudinal direction L. For example, a ratio of the length of leak detection pad 250 to the width of leak detection pad 250 may be no less than 2:1 and no greater than 20:1). In certain example embodiments, the length of leak detection pad 250 may be no less than two inches (2") and no greater than six inches (6"), and the width of leak detection pad 250 may be no less than half an inch (0.5") and no greater than two inches (2").

RFID tag 242 and/or leak detection pad 250 may be formed on or mounted to a suitable component of filter cartridge 220. For example, RFID tag 242 and/or leak detection pad 250 may be formed on or mounted to a label 260 of filter cartridge 220 that is adhered to casing 222, e.g., at outer surface 234 of casing 222. In particular, terminals 252, 254 may be printed on label 260, e.g., on a plastic layer 264 of label 260. In particular, terminals 252, 254 may be printed at a rear surface of plastic layer 264 that faces casing 222. Conversely, instructions and other information may be printed on a front surface of plastic layer 264 that faces away from casing 222. In certain example embodiments, conductive fingers 256 of first terminal 252 and conductive fingers 258 of second terminal 254 may be printed on label 260, e.g., on plastic layer 264 of label 260. As another example, conductive fingers 256 of first terminal 252 and conductive fingers 258 of second terminal 254 may be printed at the rear surface of plastic layer 264 that faces casing 222.

Label 260 may also include a paper layer 262. Paper layer 262 may assist with transferring, e.g., wicking, liquid to leak detection pad 250. For example, paper layer 260 may be configured to transfer and/or wick liquid to terminals 252, 254. In particular, paper layer 262 may contact conductive fingers 256 of first terminal 252 and conductive fingers 258 of second terminal 254. In certain example embodiments, conductive fingers 256 of first terminal 252 and conductive fingers 258 of second terminal 254 may be printed on paper layer 262. Paper layer 262 may be positioned between leak detection pad 250, e.g., conductive fingers 256, 258, and outer surface 234 of casing 222.

Label 260 may extend between a top portion 266 and a bottom portion 268, e.g., along the transverse direction T. Paper layer 262 may extend from bottom portion 268 of label 260 to terminals 252, 254, e.g., along the longitudinal direction L. For instance, paper layer 262 may extend from between a top portion 267 and a bottom portion 269, e.g., along the transverse direction T. Paper layer 262 may extend from bottom portion 268 of label 260 to conductive fingers 256, 258 along the longitudinal direction L. For instance, bottom portion 267 of paper layer 262 may be positioned at bottom portion 268 of label 260. Terminals 252, 254, e.g., conductive fingers 256, 258, may be spaced from bottom portion 268 of label 260 and/or bottom portion 269 of paper layer 262 along the transverse direction T. For instance, terminals 252, 254, e.g., conductive fingers 256, 258, may be positioned at or adjacent top portion 267 of paper layer 262. Bottom portion 268 of label 260 and/or bottom portion 267 of paper layer 262 may be positioned adjacent bottom portion 230 of casing 222. Paper layer 262 may be configured to transfer and/or wick liquid from bottom portion 230 of casing 222 to terminals 252, 254, e.g., conductive fingers 256, 258.

RFID tag 242 may include an antenna 270. Antenna 270 may be configured for transmitting signals from RFID tag 242 and/or receiving signals from RFID reader 244. Antenna 270 may be spaced from paper layer 262. By spacing antenna 270 from paper layer 262, liquid within paper layer 262 that is transferred by paper layer 262 to leak detection pad 250 may advantageously not interfere with signal communication of RFID tag 242 at antenna 270. Antenna 270 of RFID tag 242 may be printed on label 260. RFID tag 242 may also include a microchip (not shown), e.g., printed on label 260.

As may be seen from the above, system 240 may be configured to detect leaks at filter cartridge 220 without losing signal communication between RFID tag 242 and RFID reader 244. Thus, RFID tag 242 may be in signal communication with RFID reader 244 when leak detection pad 250 is exposed to liquid and/or detects the liquid. By maintaining signal communication between RFID tag 242 and RFID reader 244, system 240 may be configured to distinguish between when liquid leaks and a missing filter cartridge 220.

Generally, system 240 includes RFID tag 242 and leak detection pad 250. RFID tag 242 and leak detection pad 250 may be mounted on filter cartridge 220 in refrigerator appliance 100. RFID tag 242 may detect a status of leak detection pad 250. For instance, when liquid is not disposed on leak detection pad 250, the circuit between RFID tag 242 and leak detection pad 250 may be open. RFID tag 242 may detect the open circuit and infer that there is no leaking liquid on filter cartridge 220. Conversely, when liquid is disposed on leak detection pad 250, the liquid may short or electrically connect terminals 252, 254 of leak detection pad 250 to close the circuit between RFID tag 242 and leak detection pad 250. RFID tag 242 may detect the closed circuit and infer that there is leaking liquid on filter cartridge 220. In alternative example embodiments, liquid may change a conductivity between terminals 252, 254, and RFID may detect the conductivity change and infer that there is leaking liquid on filter cartridge 220.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A filter cartridge, comprising:
    a casing;
    a filter medium disposed within the casing;
    a radio-frequency identification, RFID, tag positioned on the casing;
    a leak detection pad positioned on the casing, the leak detection pad comprising a pair of terminals, each terminal of the pair of terminals comprising a respective plurality of conductive fingers, the plurality of conductive fingers of a first terminal of the pair of terminals interdigitated with the plurality of conductive fingers of a second terminal of the pair of terminals; and
    a label adhered to the casing, the RFID tag and the leak detection pad positioned under the label on the casing,
    wherein the RFID tag is in communication with the leak detection pad, and the RFID tag is configured to transmit a leak detection signal in response to a liquid at the leak detection pad, and
    wherein a paper layer of the label contacts the pair of terminals of the leak detection pad, and an antenna of the RFID tag is spaced from the paper layer of the label beneath the label.

2. The filter cartridge of claim 1, wherein the RFID tag is configured to transmit the leak detection signal to an RFID reader in response to the liquid at the leak detection pad.

3. The filter cartridge of claim 1, wherein the plurality of conductive fingers of the first terminal and the plurality of conductive fingers of the second terminal are printed on the label.

4. The filter cartridge of claim 3, wherein the plurality of conductive fingers of the first terminal and the plurality of conductive fingers of the second terminal are printed on a plastic layer of the label.

5. The filter cartridge of claim 4, wherein the paper layer of the label contacts the plurality of conductive fingers of the first terminal and the plurality of conductive fingers of the second terminal.

6. The filter cartridge of claim 4, wherein the label extends between a top portion and a bottom portion, the paper layer extending from the bottom portion of the label to the plurality of conductive fingers of the first terminal and the plurality of conductive fingers of the second terminal.

7. The filter cartridge of claim 6, wherein the bottom portion of the label is positioned adjacent a bottom portion of the casing.

8. The filter cartridge of claim 6, wherein the antenna of the RFID tag is positioned between the top portion of the paper layer and a top portion of the casing beneath the label.

9. The filter cartridge of claim 1, wherein the RFID tag and the leak detection pad are printed on the label.

10. The filter cartridge of claim 9, wherein the label extends between a top portion and a bottom portion, the paper layer extending from the bottom portion of the label to the pair of terminals.

11. The filter cartridge of claim 10, wherein the bottom portion of the label is positioned adjacent a bottom portion of the casing.

12. The filter cartridge of claim 1, wherein a length of the leak detection pad between opposite ends of the pair of terminals along a longitudinal direction is greater than a width of the leak detection pad between opposite sides of the pair of terminals along a transverse direction, the transverse direction being perpendicular to the longitudinal direction.

13. The filter cartridge of claim 12, wherein a ratio of the length of the leak detection pad to the width of the leak detection pad is no less than 2:1 and no greater than 20:1.

14. The filter cartridge of claim 12, wherein the length of the leak detection pad is no less than two inches and no greater than six inches, and the width of leak detection pad is no less than half an inch and no greater than two inches.

15. A filter cartridge, comprising:
- a casing;
- a filter medium disposed within the casing;
- a label attached to the casing;
- a radio-frequency identification, RFID, tag positioned under the label on the casing; and
- a leak detection pad positioned under the label on the casing, the leak detection pad comprising a pair of terminals, each terminal of the pair of terminals comprising a respective plurality of conductive fingers, the plurality of conductive fingers of a first terminal of the pair of terminals interdigitated with the plurality of conductive fingers of a second terminal of the pair of terminals,
- wherein the RFID tag is in communication with the leak detection pad, and the RFID tag is operable to transmit a signal to an RFID reader when the leak detection pad contacts a liquid, and
- wherein a paper layer of the label contacts the pair of terminals of the leak detection pad, and an antenna of the RFID tag is spaced from the paper layer of the label beneath the label.

16. The filter cartridge of claim 15, wherein the plurality of conductive fingers of the first terminal and the plurality of conductive fingers of the second terminal are printed on a plastic layer of the label.

17. The filter cartridge of claim 16, wherein the paper layer of the label contacts the plurality of conductive fingers of the first terminal and the plurality of conductive fingers of the second terminal.

18. The filter cartridge of claim 17, wherein the label extends between a top portion and a bottom portion, the paper layer extending from the bottom portion of the label to the plurality of conductive fingers of the first terminal and the plurality of conductive fingers of the second terminal.

19. The filter cartridge of claim 18, wherein the bottom portion of the label is positioned adjacent a bottom portion of the casing.

20. The filter cartridge of claim 15, wherein the leak detection pad is printed on the label.

* * * * *